United States Patent
Winton et al.

(10) Patent No.: US 12,545,263 B2
(45) Date of Patent: Feb. 10, 2026

(54) APPARATUS AND METHOD FOR PARENT MONITORING OF AUDIO CONTENT IN A VEHICLE

(71) Applicant: HARMAN INTERNATIONAL INDUSTRIES, INCORPORATED, Stamford, CT (US)

(72) Inventors: Riley Winton, Opelika, AL (US); Chris Ludwig, Bloomfield Hills, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 333 days.

(21) Appl. No.: 17/797,590

(22) PCT Filed: Feb. 19, 2021

(86) PCT No.: PCT/US2021/018794
§ 371 (c)(1),
(2) Date: Aug. 4, 2022

(87) PCT Pub. No.: WO2021/168260
PCT Pub. Date: Aug. 26, 2021

(65) Prior Publication Data
US 2023/0054915 A1    Feb. 23, 2023

Related U.S. Application Data

(60) Provisional application No. 62/979,838, filed on Feb. 21, 2020.

(51) Int. Cl.
*B60W 40/08* (2012.01)
*B60W 50/10* (2012.01)
*H04N 21/233* (2011.01)

(52) U.S. Cl.
CPC ............ *B60W 40/08* (2013.01); *B60W 50/10* (2013.01); *H04N 21/233* (2013.01); *B60W 2540/21* (2020.02); *B60W 2540/227* (2020.02)

(58) Field of Classification Search
CPC .. B60W 40/08; B60W 50/10; B60W 2540/21; B60W 2540/227; G06F 3/167;
(Continued)

(56) References Cited

U.S. PATENT DOCUMENTS 9,641,934 B2 * 5/2017 Herbig .................. H04R 1/406
9,773,495 B2 * 9/2017 MacNeille ....... G10K 11/17857
(Continued)

FOREIGN PATENT DOCUMENTS

JP       H11355748 A    12/1999

OTHER PUBLICATIONS

European Office Action dated Sep. 22, 2023 for European Application No. 21711442.0 filed Aug. 17, 2022, 8 pgs.
(Continued)

*Primary Examiner* — Mohamed Abdo Algehaim
(74) *Attorney, Agent, or Firm* — BROOKS KUSHMAN P.C.

(57) ABSTRACT

In at least one embodiment, an apparatus and method for monitoring audio content that is played back in a vehicle is provided. The apparatus includes memory and a media controller. The media controller includes the memory and is programmed to transmit first media content as desired by one or more first vehicle occupants positioned in a first zone seating area and to transmit second media content as desired one or more second vehicle occupants positioned in a second zone seating area. The media controller is further programmed to receive an indication from the one or more first vehicle occupants to transmit the second media content in the first zone seating area and to transmit the second media
(Continued)

content for monitoring by the one or more first vehicle occupants in the first zone seating area based on the indication.

15 Claims, 4 Drawing Sheets

(58) Field of Classification Search
CPC ............. H04N 21/233; H04N 21/4122; H04N 21/4126; H04N 21/436; H04N 21/44222; H04N 21/4755; H04N 21/41422
USPC .............................................................. 701/1
See application file for complete search history.

(56) References Cited

U.S. PATENT DOCUMENTS

| | | | | |
|---|---|---|---|---|
| 9,972,316 B2* | 5/2018 | Heber | | G10L 15/20 |
| 11,573,678 B2* | 2/2023 | Dazé | | G06F 3/0482 |
| 11,862,139 B2* | 1/2024 | Pignier | | G10K 11/17857 |
| 2002/0159270 A1* | 10/2002 | Lynam | | B60Q 1/2665 |
| | | | | 362/492 |
| 2006/0262935 A1* | 11/2006 | Goose | | H04S 3/002 |
| | | | | 381/17 |
| 2013/0179163 A1* | 7/2013 | Herbig | | G10L 21/0208 |
| | | | | 381/86 |
| 2014/0128146 A1* | 5/2014 | Story, Jr. | | A63F 13/00 |
| | | | | 463/36 |
| 2017/0064516 A1* | 3/2017 | Buttolo | | B60K 35/85 |
| 2017/0185362 A1* | 6/2017 | Cansino | | H04N 21/4223 |
| 2017/0193991 A1* | 7/2017 | Heber | | G10L 15/20 |
| 2017/0297490 A1* | 10/2017 | Lynam | | H04N 25/76 |
| 2018/0088777 A1* | 3/2018 | Dazé | | G06F 3/0488 |
| 2018/0189024 A1* | 7/2018 | Trestain | | H04M 1/72457 |
| 2018/0357029 A1* | 12/2018 | Bianchi | | G06F 3/147 |
| 2018/0357233 A1* | 12/2018 | Dazé | | G06F 16/44 |
| 2019/0230401 A1* | 7/2019 | Chamberlain | | H04N 21/41422 |
| 2020/0221156 A1* | 7/2020 | Caltabiano | | H04N 21/43637 |
| 2021/0235191 A1* | 7/2021 | Saito | | H04R 3/005 |
| 2022/0046309 A1* | 2/2022 | Caltabiano | | H04N 21/41422 |
| 2025/0173107 A1* | 5/2025 | Zhou | | G06F 3/04886 |

OTHER PUBLICATIONS

International Search Report and Written Opinion dated May 10, 2021 for PCT Appn. No. PCT/US2021/018794 filed Feb. 19, 2021, 14 pgs.
International Preliminary Report on Patentability dated Sep. 1, 2022 for PCT Appn. No. PCT/US2021/018794 filed Feb. 19, 2021, 9 pgs.
Korean Office Action dated Apr. 14, 2025 for Korean Application No. 10-2022-7027479 filed Aug. 9, 2022, 9 pgs.
Japanese Office Action dated Feb. 20, 2025 for Japanese Application No. 2022-546391 filed Jul. 29, 2022, 8 pgs.
Office Action issued Jul. 8, 2025 of Korean application No. 10-2022-7027479, 5 pages.

* cited by examiner

*Listen In Interaction:*
*- Push and hold (or push to toggle) to route rear audio to front zone - allowing front zone to monitor and supervise rear zone content*
*- In future could also route video/images to front display for full content supervision - pending legal/ethical issues with distracted driving*

APPARATUS AND METHOD FOR PARENT MONITORING OF AUDIO CONTENT IN A VEHICLE

CROSS-REFERENCE TO RELATED APPLICATIONS

This application is the U.S. national phase of PCT Application No. PCT/US2021/018794, filed on Feb. 19, 2021 which claims the benefit of U.S. provisional application Ser. No. 62/979,838 filed Feb. 21, 2020, the disclosures of which are hereby incorporated in their entirety by reference herein.

TECHNICAL FIELD

Aspects disclosed herein generally relate to an apparatus and method for monitoring of audio content in a vehicle. These aspects and others will be discussed in more detail herein.

BACKGROUND

In a sound zone scenario, multiple users may each listen to his or her type of audio in a corresponding zone. In this case, conflicting audio from other or adjacent zones may be reduced or eliminated. One popular use case for a multiple sound zone scenario in the automotive space involves parents sitting in a front row of the vehicle listening to music while one or more children are positioned in a rear row of the vehicle watching a movie. A common issue in this use case involves parental control. Often parents may desire to monitor the media their children, particularly, teenagers are consuming.

SUMMARY

In at least one embodiment, an apparatus and method for monitoring audio content that is played back in a vehicle is provided. The apparatus includes memory and a media controller. The media controller includes the memory and is programmed to transmit first media content as desired by one or more first vehicle occupants positioned in a first zone seating area and to transmit second media content as desired one or more second vehicle occupants positioned in a second zone seating area. The media controller is further programmed to receive an indication from the one or more first vehicle occupants to transmit the second media content in the first zone seating area and to transmit the second media content for monitoring by the one or more first vehicle occupants in the first zone seating area based on the indication.

In at least another embodiment, a computer-program product embodied in a non-transitory computer read-able medium that is programmed for monitoring audio content that is played back in a vehicle is provided. The computer-program product includes instructions for transmitting first media content as desired by one or more first vehicle occupants positioned in a first zone seating area and transmitting second media content as desired one or more second vehicle occupants positioned in a second zone seating area. The computer-program product further includes receiving an indication at a media controller from the one or more first vehicle occupants to transmit the second media content in the first zone seating area and transmitting the second media content for monitoring by the one or more first vehicle occupants in the first zone seating area based on the indication.

In at least another embodiment, a method for providing monitoring audio content that is played back in a vehicle is provided. The method includes transmitting first media content as desired by one or more first vehicle occupants positioned in a first zone seating area and transmitting second media content as desired one or more second vehicle occupants positioned in a second zone seating area. The method further includes receiving an indication at a media controller from the one or more first vehicle occupants to transmit the second media content in the first zone seating area and transmitting the second media content for monitoring by the one or more first vehicle occupants in the first zone seating area based on the indication.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
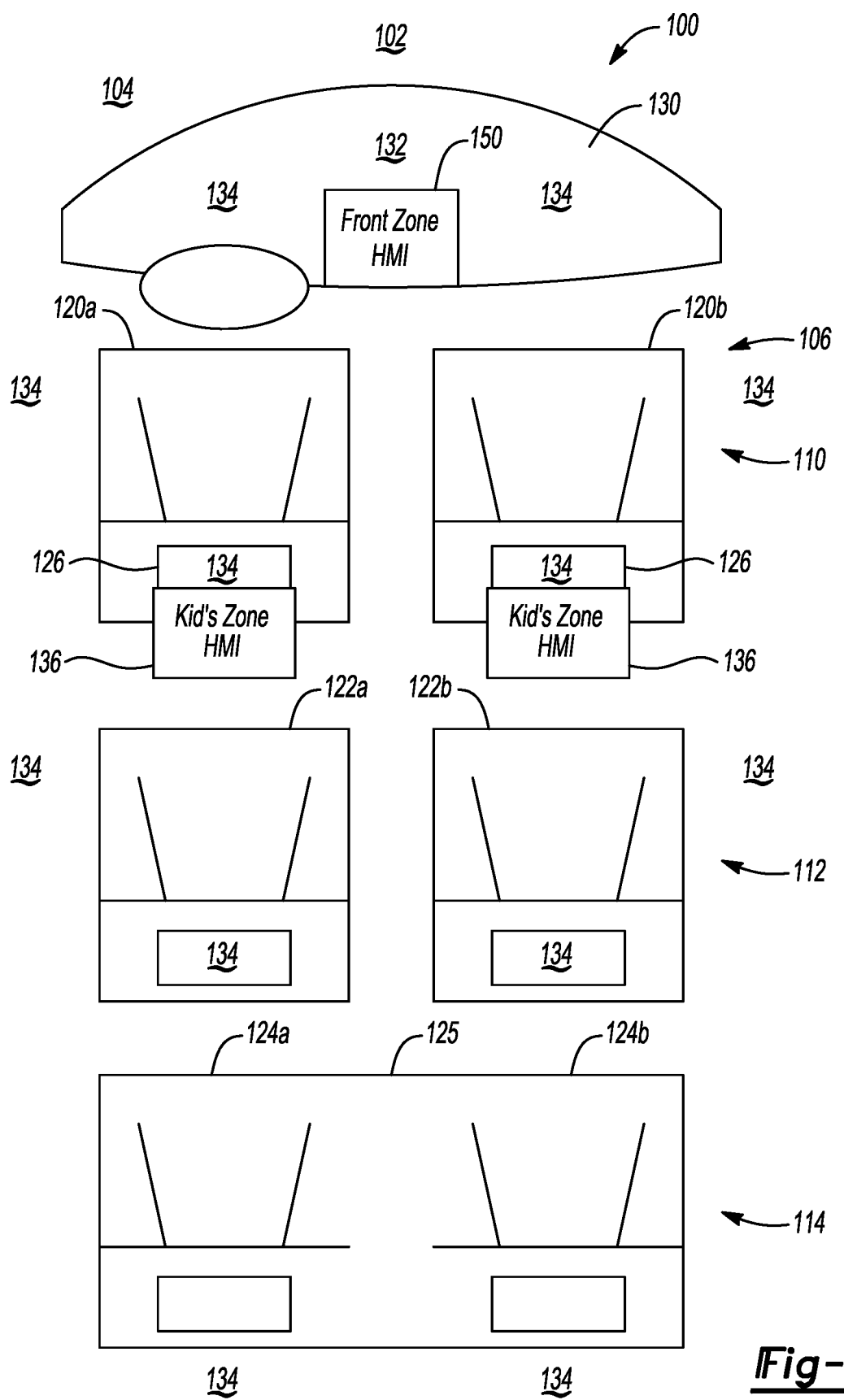
FIG. 1 depicts a system for providing parental supervision and monitoring of audio in a vehicle in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that at least one controller as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, the at least one controller as disclosed herein utilize one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The disclosed controller(s) also include hardware-based inputs and outputs for receiving and transmitting data, respectively from and to other hardware-based devices as discussed herein.

In a sound zone scenario, multiple users may each listen to his or her type of audio in a corresponding zone. In this case, conflicting audio from other or adjacent zones may be reduced or eliminated. One popular use case for a multiple sound zone scenario in the automotive space involves parents sitting in a front row of the vehicle listening to music while one or more children are positioned in a rear row of the vehicle watching a movie. A common issue in this use case involves parental control. Often parents may desire to monitor the media their children, particularly, teenagers are consuming.

Embodiments set forth herein may provide, but not limited to, a user interface that provides a human machine interface (HMI) positioned on a front zone of the vehicle (e.g., on an instrument panel, front driver seat, and/or front passenger seat). The user interface may include a touchscreen button (or touchscreen switch), physical button, or other suitable type of human-input device that can be pressed to automatically route audio content that is played back in a rear zone of the vehicle temporarily to the front zone. This aspect may enable front row occupants (e.g., parents) to quickly and seamlessly monitor the rear row media content, without disrupting the front row content. Additionally, parental controls on the HMI may limit specific sources that the parents do not want their children to access to or to listen to. For example, Netflix®, Spotify®, Youtube®, other streaming services, or movies above a given rating (ex: PG-13). These aspects and others will be discussed in more detail below.

FIG. 1 depicts a system 100 for providing parental supervision and monitoring of audio in a vehicle 102 in accordance to one embodiment. The vehicle 100 includes a vehicle audio system 104 arranged to playback audio within the listening environment 106 (or listening room) of the vehicle 102. The vehicle 100 generally includes a first zone seating area 110, a second zone seating area 112, and a third zone seating area 114. It is recognized that the number of zone seating areas positioned in the vehicle 100 may vary based on the desired criteria of a particular implementation.

The first zone seating area 110 may include first and second seats 120a and 120b, respectively. The first seat 120a may correspond to a driver's seat and the second seat 120b may correspond to a front passenger's seat. The second zone seating area 112 may include first and second seats 122a and 122b. The first seat 122a may correspond to a left side rear passenger seat and the second seat 122b may correspond to a right-side rear passenger seat. Similarly, the third zone seating area 114 may include first and second seats 124a and 124b. The first seat 124a may correspond to a left side rear passenger seat and the second seat 124b may correspond to a right-side rear passenger seat. The first and second seats 124a and 124b of the third zone seating area 112 may form an integrated bench 125 that couples the first and second seats 124a and 124b to one another. While the various zones 110, 112, 114 as illustrated in FIG. 1 coincide with vehicle rows that includes at least two seats, it is recognized that such zones 110, 112, 114 may be adapted to coincide to a single seat and is not intended to be limited to a zone having a full row configuration for purposes of applying the aspects related to the present disclosure.

The vehicle 100 also includes an instrument panel 130 and a media controller (or media controller) 132 positioned on the instrument panel 130. Various loudspeakers 134 may be positioned about the vehicle 102 to playback audio processed by the media controller 132. It is recognized that various headrests 126 as positioned on the seats 120a, 120b, 122a, 122b may include loudspeakers 134 that are headrest loudspeakers for playing back audio to a vehicle occupant that is positioned rearward to a corresponding seat 120a, 120b, 122a, and 122b. Various displays (not shown) may also be positioned on the headrests 126 to provide desired video content for vehicle occupants in the second and third zone seating areas 112 or 114. The implementation of the headrest loudspeakers 134 may be optional. It is also recognized that any one or more of the headrests 126 may include sub media controllers (or sub-media controllers) 136 to process audio data for passengers in any one or more of the seats 122a, 122b, 124a, and 124b. The various occupants in the vehicle 100 may pair a corresponding mobile device 123 via a wireless communication protocol (e.g., BLUETOOTH or other suitable protocol) such that the mobile device 123 provides audio data to the media controller 132 and/or the sub media controller 136 to play back the audio data via a particular loudspeaker 134 in the vehicle 100.

Generally speaking, occupants positioned in the first zone seating area 110 may playback audio data that is different than the audio played back in one or more of the second zone seating area 112 and the third zone seating area 114. Similarly, occupants sitting in the seats 122a, 122b, 124a, and 124b may listen to audio that is different from one another assuming the corresponding seat positioned in front of them includes a corresponding sub media controller One non-limiting scenario of this aspect may include parents being situated in the first zone seating area 110 and children being be situated in the second and/or third zone seating areas 112, 114. It is recognized that the embodiments as disclosed herein may generally apply to any user positioned in the first zone seating area 110 who would like to listen to and/or view, audio and/or video, that is being played back in at least one of the second zone seating area 112 or the third zone seating area 114.

In some instances, a parent sitting in the first zone seating area 110 may desire to monitor the audio content that is being played back by any one or more of the sub-media controllers 136 associated with respective seats 120a, 120b, 122a, 122b, 124a, 124b (or in the second zone seating area 112 and the third zone seating area 114). The media controller 132 generally includes a user interface 150 (e.g., a human interface machine (HMI)) that enables one or more of the parents (or other users (e.g. not limited to parents)) to control the media controller 132 to divert audio that is being played back by any one or more of the sub-media controllers 136 positioned in the various seats 120a, 120b, 122a, 122b, 124a, and/or 124b via loudspeakers 134 in the first zone seating area 110 for monitoring. The media controller 132 may attenuate the audio that is previously being played back for the parents such that the loudspeakers 134 play back the audio data that is being played back (e.g., the children's audio) in the first zone seating area 110 for monitoring by the parents. In another example, the media controller 132 may simply mute the audio that is previously being played back for the parents to enable the media controller 132 to play back the audio data that is being played back (e.g., the children's audio) in the first zone seating area 110 for monitoring by the parents. It is also recognized that the media controller 132 may control a single sub-media controller 136 positioned in the second zone seating area 112 or in the third zone seating area 114 to divert its audio that is being played back so that the media controller 132 may play back such audio in the first zone seating area 110 for monitoring by the parents. This may be particularly useful in the event two children are located in either the second zone seating area 112 or the third zone seating area 114 and these children are playing back audio that is different from one another.

Figure 2:
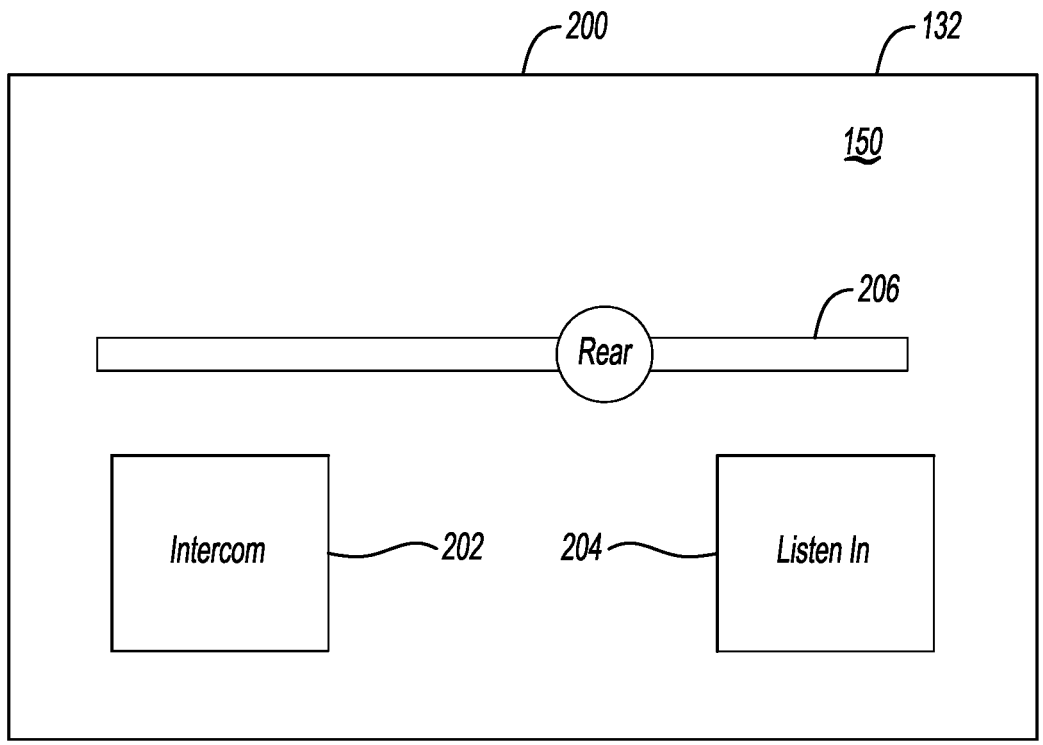
FIG. 2 depicts one example of a display on an media controller that enables a user (i.e., or parent) to select a corresponding option to monitor audio that is being played back in a rear zone of the vehicle while the user is positioned in a front zone of the vehicle in accordance to one embodiment.

FIG. 2 depicts one example of a display 200 on the media controller 132 that enables a user (i.e., or parent) to select a corresponding option to monitor audio that is being played back in a rear zone (e.g., the second zone seating area 112 and the third zone seating area 114) of the vehicle 100 while the user is positioned in a front zone (e.g., the first zone seating area 110) of the vehicle 100 in accordance to one embodiment. It is also recognized that the display 200 may also be positioned on the mobile device 123 (or be implemented as part of the mobile device 123) and may wirelessly transmit the indication via the wireless protocol to the media controller 132. The display 200 includes an intercom selection field 202 (e.g., first switch), a listen in selection field 204 (e.g., second switch), and a rear adjustment field 206 (e.g., slider bar or third switch). The intercom selection field 202, when selected, enables the parent (or other user) to speak into a microphone (not shown) to transmit audio from one or more of the users to the loudspeaker 134 in the second zone seating area 112 and/or the third zone seating area 114). The listen in selection field 204, when selected by the user in the first zone seating area 110, may route the audio data that is being played back in the second zone seating area 112 and/or the third zone seating area 114 to the media controller 132 positioned in the first zone seating area 110 to enable users (e.g., parents) to monitor the audio that is being played back for other users (e.g., children) in one or more of the second and third zone seating areas 112 and 114. One example of this feature may involve a vehicle that is full of adults and adults seated in a back row of the vehicle start to laugh uncontrollably. In this case, the adult seated in the first zone seating area 110 may select the listen in selection field 204 to "see what's so funny" or "see what all the fuss is about" in the back row of the vehicle.

In one example, the rear adjustment field 206, when selected, may enable a parent (or other user positioned in the first zone seating area 110) to move the field to correspond to a particular seat of interest (e.g., 120a, 120b, 122a, 122b, 124a, 124b) such that the audio is played back at the media controller 132 for the particular set of interest in a given zone seating area 112 or 114. In another example, the rear adjustment field 206 may correspond to the amount of volume attributed to the audio that is played back from the second or third zone seating area 112, 114 relative to the volume being played back at the media controller 132 in the first zone seating area 110. The rear adjustment field 206 includes a volume limit switch 208 that limits the volume of the audio that is being played back in the second or third zone seating area 112, 114.

Figure 3:
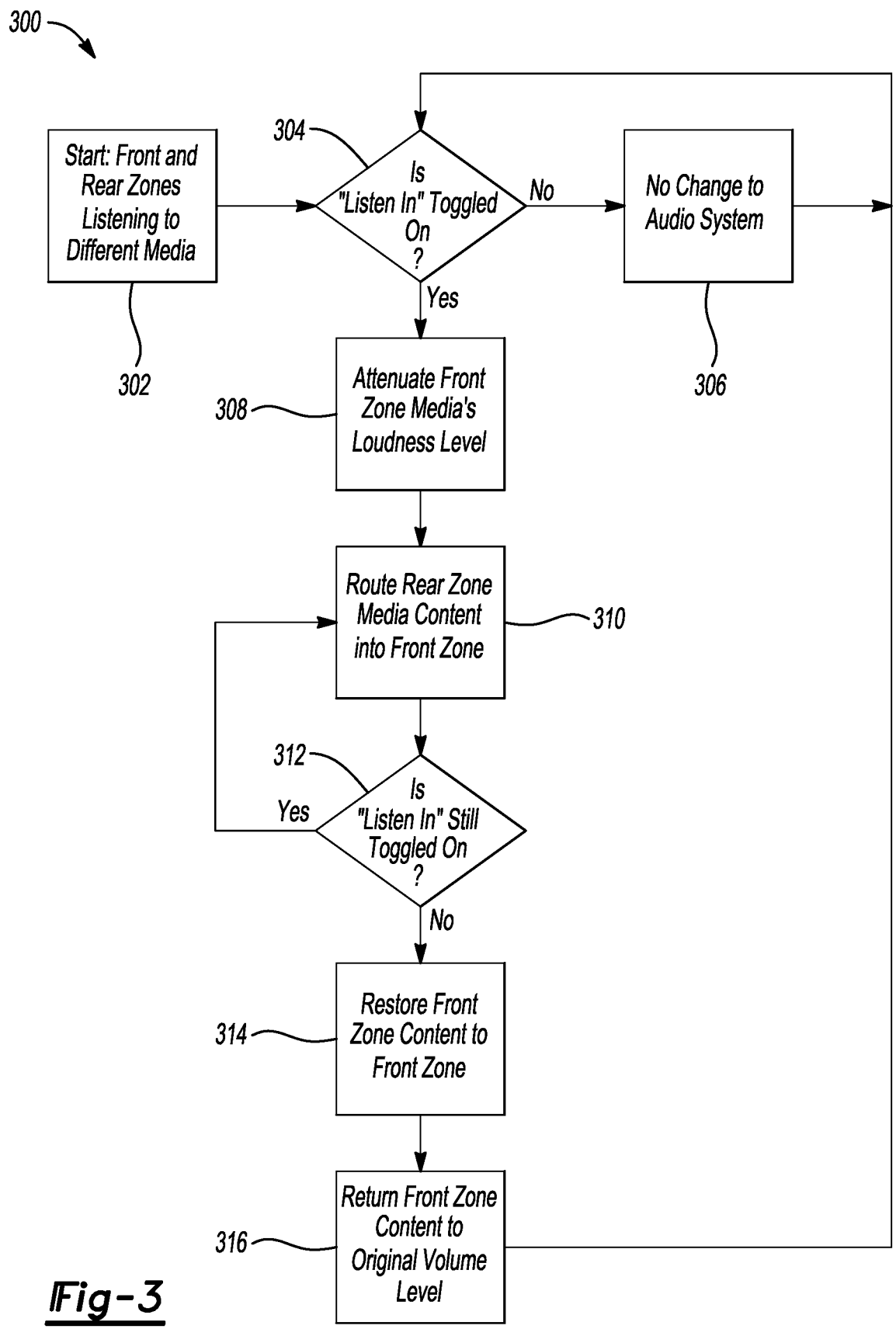
FIG. 3 depicts a method for providing parental supervision and monitoring of audio in the vehicle in accordance to one embodiment.

FIG. 3 depicts a method 300 for providing the monitoring of audio in the vehicle 100 in accordance to one embodiment.

In operation 302, the media controller 132 plays back audio for users (e.g., parents) situated in the first zone seating area 110 and the one or more of the sub-media controllers 136 positioned in the second zone seating area 112 and/or the third zone seating area 114 play back audio for one or passengers (e.g., children, teens, etc.) positioned in the second and/or third zone seating areas 112, 114. It is recognized that the sub-media controller(s) 136 may be integrated with the media controller 132. Alternatively or additionally, the sub-media controllers (s) 136 may be formed as standalone controllers that are positioned in the second and third zone seating area 112 and 114 separate from the media controller 132.

In operation 304, the media controller 132 determines whether a vehicle occupant (e.g., either the driver or first row passenger) has selected the listen in selection field 204 to monitor the audio that is being played back by the users (e.g., children or teens) positioned in the second or third zone seating area 112, 114. If the listen in selection field 204 has not been selected, the method moves to operation 306. If the listen in selection field 204 has been selected, then the method 300 moves to operation 308.

In operation 306, the method 300 moves back to operation 304.

In operation 308, the media controller 132 attenuates the volume of the audio that is being played back (e.g., audio that is desired to be played back in the first zone seating area 110 for the enjoyment of the occupants (e.g., parents) in the vehicle 104). In another example, the media controller 132 may simply mute the audio that is being played back for the enjoyment of the users (e.g., parents) in the first zone seating area 110.

In operation 310, the media controller 132 diverts the audio that is being played back in the second or third zone seating area 112 or 114 for the users (e.g., children (or teens)) for playback via the loudspeakers 134 in the first zone seating area 110 for monitoring by the users (e.g., parents) positioned in the first zone seating area 110.

In operation 312, the media controller 132 determines whether the listen in selection field 204 is still being selected (or toggled on) by the vehicle occupant (or parents) positioned in the first zone seating area 110. If this condition is true, then the method 300 moves back to operation 310. If not, then the method 300 moves to operation 314.

In operation 314, the media controller 132 restores the audio playback of the audio in the first zone seating area 110 to play back the audio for the enjoyment of the occupants (e.g., the parents). For example, in the event such audio has been muted to enable the audio to be played back from the second or third zone seating area 112 or 114, the audio that is desired to be played back for the enjoyment of the users (e.g., parents) will be restored.

In operation 316, the media controller 132 returns the volume of the audio playback in the first zone seating area 110 to the volume that such audio was previously at prior to the listen-in selection field 204 being selected.

The method 300 returns back to operation 304 after operation 316 is executed.

Additional embodiments of the disclosed system 100 and method 300 may involve providing an option on the media controller 132 to enable the users (e.g., parents) in the first zone seating area 110 to disable the audio as being played back in the second and/or third zone seating areas 112 or 114 in the event the parents deem the audio content unsuitable for listening for the children positioned in the second and third zone seating areas 112, 114.

It is recognized that video/images that are also being played back via displays positioned in the second or third zone seating areas 112, 114 (e.g., as positioned on the headrests 134) may also be diverted to the display 200 on the media controller 132. In this case, assuming that the corresponding mobile device 123 (e.g., cell phone, tablet, laptop, etc.) belonging to one or more passengers in the second or third zone seating area 112, 114 is operably coupled to the various sub-media controllers 136 (e.g., via BLUETOOTH or other suitable alternative protocol), the media controller 132 may control the sub-media controllers 136 to divert the video that is being played back in the second or third zone seating area 112, 114 to the display 200 of the media controller 132. In this case, users (e.g., parents) seated in the first zone seating area 110 may monitor the video that is being played back by the users (e.g., children) in the second or third zone seating area 112, 114. Similarly, users (e.g., parents) in the first zone seating area 110 may disable the video that is being played back in the second and/or third zone seating area 112, 114 via selection on the media controller 132 in the event the users (e.g., parents) find such video unsuitable for the users (e.g., children) positioned in the second and/or third zone seating areas 112, 114.

Similar to the audio example noted above and the diversion of the audio from the sub-media controllers 136 to the media controller 132, the media controller 132 may control a single sub-media controller 136 positioned in the second zone seating area 112 or in the third zone seating area 114 to divert its video and audio that is being played back so that the media controller 132 may play back such video and audio in the first zone seating area 110 for monitoring by the users (e.g., parents). This may be particularly useful in the event two users (e.g., children) are located in either the second zone seating area 112 or the third zone seating area 114 and these users are playing back video/audio that is different from one another. The sub-media controllers 132 may divert the audio/video data from the second zone seating area 112 and/or the third zone seating area 114 via a multi-media communication protocol such as a Media Orientated Systems Transport (MOST) or other suitable multimedia communication protocol.

Figure 4:
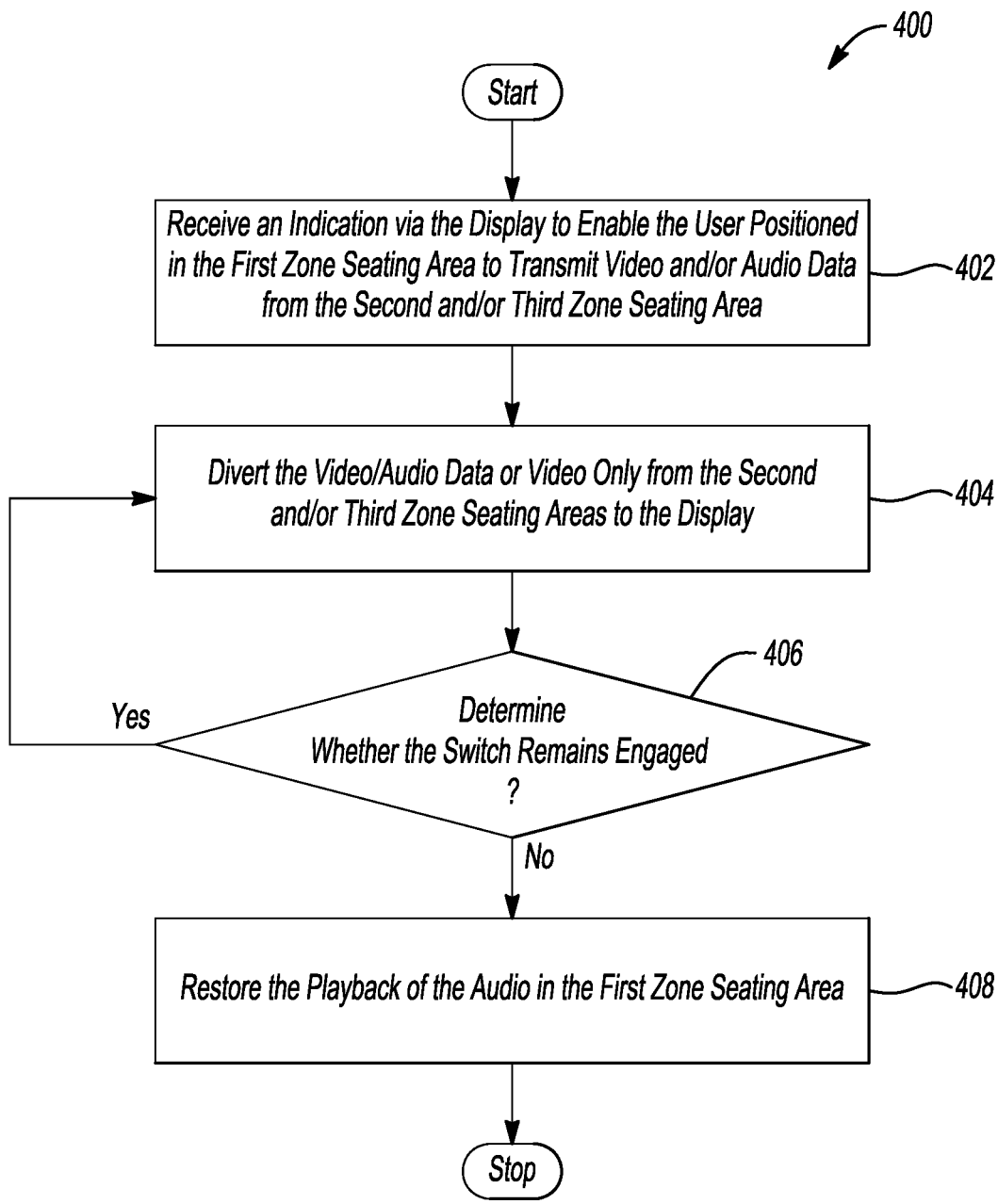
FIG. 4 depicts another method for providing parental supervision and monitoring of video and/or audio in accordance to one embodiment.

FIG. 4 depicts a method 400 for the monitoring of video and audio in the vehicle 100 in accordance to another embodiment.

In operation 402, the media controller 132 receives an indication via the display 200 to enable the parent (or other user) positioned in the first zone seating area 110 to transmit the video/audio data that is being played back on the mobile device 124 positioned in the second zone seating area 112 and the third zone seating area 114. For example, while the user is positioned in the first zone seating area 110 and listening to video and/or audio (e.g., a first media content) may select the listen in selection field 204 when the user desires to view and/or listen to the video and/or audio (e.g., second media content) that is being played back in the second zone seating area 112 and/or the third zone seating area 114. It is recognized that the user may have the option of selecting the video and audio for the media that is being played back in the second zone seating area 112 and/or the third zone seating area 114, the audio only for the media that is being played back in the second zone seating area 112 and/or the third zone seating area 114, and/or the video only for the media that is being played back in the second zone seating area 112 and/or the third zone seating area 114. With that latter option, the user may simply decide to only view the video that is being played back so that any video that is played with the video does not interfere with the actual audio data that is being played back (and desired) by the user(s) positioned in the first zone seating area 110.

In operation 404, the media controller 132 diverts the video/audio data or video only data to the display 200 from the second and/or third zone seating areas 112, 114. As noted above, in one example, the mobile device(s) 123 positioned in the second and/or third zone seating areas 112, 114 may be wireless coupled to the media controller 132 via a wireless protocol such as Bluetooth or other suitable protocol. In this case, the media controller 132 may display the video that is being received from the mobile device(s) 123 via the wireless protocol. In another example, the sub-media controllers 132 positioned in the second and/or third zone seating areas 112, 114 may transmit the video/audio or video only to the media controller 136 via MOST communication bus or other suitable multimedia communication bus.

In operation 406, the media controller 132 determines whether the listen in field 204 remains actively engaged by the user. The media controller 132 determines whether the listen in selection field 204 is still being selected (or toggled on) by the vehicle occupant (or parents) positioned in the first zone seating area 110. If this condition is true, then the method 400 moves back to operation 404. If not, then the method 400 moves to operation 408.

In operation 408, the media controller 132 restores the playback of the audio in the first zone seating area 110 to play back the audio for the enjoyment of the occupants (e.g., the parents). For example, in the event such audio has been muted to enable the video/audio to be played back from the second or third zone seating area 112 or 114, the audio that is desired to be played back for the enjoyment of the parents will be restored.

As has been stated throughout, the user(s) in the first zone seating area 110 may correspond to, for example, parents and the user(s) in the second and/or third zone seating areas 112, 114 may correspond to, for example, a child or children for purpose of monitoring audio and/or video consumption in the second and/or third zone seating areas 112, 114.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for monitoring audio content that is played back in a vehicle, the apparatus comprising:
    memory; and
    a media controller including the memory and programmed to:
    transmit first media content including first video data and first audio data as desired by one or more first vehicle occupants positioned in a first zone seating area;
    transmit second media content including second video data and second audio data as desired by one or more second vehicle occupants positioned in a second zone seating area;
    receive an indication, via a user interface, from the one or more first vehicle occupants to transmit the second media content to the first zone seating area for playback in the first zone seating area;
    playback the second audio data of the second media content for monitoring by the one or more first vehicle occupants in the first zone seating area based on the indication;
    reduce a volume of the first audio of the first media content in the first zone seating area while playing back the second audio data on the second media content in the first zone seating area after receiving the indication to enable the one or more first vehicle occupants positioned in the first zone seating area to listen to the second audio data; and reduce the volume of the first audio data of audio on the first media content and continue to display the first video data of the first media content in the first zone seating area while playing back the second audio data on the second media content in the first zone seating area.

2. The apparatus of claim 1, wherein the media controller includes sub-media controllers positioned in one or more seats in the second zone seating area.

3. The apparatus of claim 1, wherein the user interface includes a switch that enables the one or more first vehicle occupants to transmit voice commands to one or more loudspeakers in the second zone seating area.

4. The apparatus of claim 1, wherein the user interface includes a switch that transmits the indication to the media controller to playback the second media content in the first zone seating area.

5. The apparatus of claim 1, wherein the user interface includes a switch that enables the one or more first vehicle occupants in the first zone seating area to control a volume limit of the second media content in the second zone seating area while the media controller plays back the first media content in the first zone seating area.

6. A computer-program product embodied in a non-transitory computer read-able medium that is executable by at least one media controller to monitor audio content that is played back in a vehicle, the computer-program product comprising instructions for:

transmitting first media content including first video data and first audio data as desired by one or more first vehicle occupants positioned in a first zone seating area;

transmitting second media content including second video data and second audio data as desired by one or more second vehicle occupants positioned in a second zone seating area;

receiving an indication, from a user interface, for the one or more first vehicle occupants to transmit the second media content to the first zone seating area for playback in the first zone seating area;

playback the second media content for monitoring by the one or more first vehicle occupants in the first zone seating area based on the indication;

reduce a volume of the first audio of the first media content in the first zone seating area while playing back the second audio data on the second media content in the first zone seating area after receiving the indication to enable the one or more first vehicle occupants positioned in the first zone seating area to listen to the second audio data; and reduce the volume of the first audio on the first media content and continue to display the first video data of the first media content in the first zone seating area while playing back the second audio data on the second media content in the first zone seating area.

7. The computer-program product of claim 6 further comprising instructions for enabling, via the user interface, the one or more first vehicle occupants to transmit voice commands to one or more loudspeakers in the second zone seating area.

8. The computer-program product of claim 6 further comprising instructions for transmitting, via the user interface, the indication to the media controller to transmit the second media content to the first zone seating area.

9. The computer-program product of claim 6 further comprising instructions for transmitting, via the user interface, the indication to the media controller to playback the second media content in the first zone seating area.

10. The computer-program product of claim 6 further comprising enabling, via the user interface, the one or more first vehicle occupants in the first zone seating area to control a volume limit of the second media content in the second zone seating area while the media controller plays back the first media content in the first zone seating area.

11. A computer-implemented method for providing monitoring audio content that is played back in a vehicle, the computer-implemented method including:

transmitting first media content including first video data and first audio data as desired by one or more first vehicle occupants positioned in a first zone seating area;

transmitting second media content including second video data and second audio data as desired by one or more second vehicle occupants positioned in a second zone seating area;

receiving an indication at a media controller from the one or more first vehicle occupants to transmit the second media content to the first zone seating area for playback in the first zone seating area;

playback the second audio data of the second media content for monitoring by the one or more first vehicle occupants in the first zone seating area based on the indication;

reducing a volume of the first audio of the first media content in the first zone seating area while playing back the second audio data on the second media content in the first zone seating area after receiving the indication to enable the one or more first vehicle occupants positioned in the first zone seating area to listen to the second audio data; and reducing the volume of the first audio on the first media content and continue to display the first video data of the first media content in the first zone seating area while playing back the second audio data on the second media content in the first zone seating area.

12. The method of claim 11 further comprising receiving the indication from a user interface.

13. The method of claim 11 further comprising enabling, via a user interface, the one or more first vehicle occupants to transmit voice commands to one or more loudspeakers in the second zone seating area.

14. The method of claim 11 further comprising instructions for transmitting, via a user interface, the indication to the media controller to playback the second media content in the first zone seating area.

15. The method of claim 11 further comprising enabling, via a user interface, the one or more first vehicle occupants in the first zone seating area to control a volume limit of the second media content in the second zone seating area while the media controller plays back the first media content in the first zone seating area.

* * * * *